(12) United States Patent
Legrand et al.

(10) Patent No.: US 7,057,801 B2
(45) Date of Patent: Jun. 6, 2006

(54) OPTICAL AMPLIFIER, TRANSMISSION SYSTEM AND METHOD FOR OPTIMIZATION

(75) Inventors: Anne Legrand, Marcoussis (FR); Dominique Bayart, Clamart (FR)

(73) Assignee: Alcatel, Paris (FR)

( * ) Notice: Subject to any disclaimer, the term of this patent is extended or adjusted under 35 U.S.C. 154(b) by 35 days.

(21) Appl. No.: 10/869,918

(22) Filed: Jun. 18, 2004

(65) Prior Publication Data
US 2004/0257641 A1 Dec. 23, 2004

(30) Foreign Application Priority Data
Jun. 19, 2003 (EP) .................. 03291500

(51) Int. Cl.
*H04B 10/12* (2006.01)
(52) U.S. Cl. ................. 359/337
(58) Field of Classification Search ........... 359/337
See application file for complete search history.

(56) References Cited

U.S. PATENT DOCUMENTS

| | | | |
|---|---|---|---|
| 5,375,010 A | 12/1994 | Zervas et al. | |
| 6,252,700 B1* | 6/2001 | Hwang et al. | 359/337 |
| 6,751,421 B1* | 6/2004 | Ranka et al. | 398/141 |
| 6,847,477 B1* | 1/2005 | Oron et al. | 359/326 |
| 2003/0072075 A1* | 4/2003 | Li et al. | 359/341.3 |
| 2003/0156316 A1* | 8/2003 | Hwang et al. | 359/337.5 |
| 2004/0042061 A1* | 3/2004 | Islam et al. | 359/334 |
| 2004/0196539 A1* | 10/2004 | Chang et al. | 359/341.41 |

FOREIGN PATENT DOCUMENTS

| | | |
|---|---|---|
| EP | 0 789 432 A1 | 8/1997 |
| JP | 10308703 A * | 11/1998 |

OTHER PUBLICATIONS

Optimum position of isolators within erbium-doped fibers. Lumholt, O.; Schusler, K.; Bjarklev, A.; Dahl-Peterson, S.; Povlsen, J.H.; Rasmussen, T.; Rottwitt, K.; Photonics Technology Letters, IEEE. vol. 4, Issue 6, Jun. 1992 pp. 568-570.*
Input power limits of single-mode optical fibers due to stimulated Brillouin scattering in optical communication systems. Aoki, Y.; Tajima, K.; Mito, I.; Lightwave Technology, Journal of; vol. 6, Issue 5, May 1988 pp. 710-719.*
Yasuhiro Aoki et al Input Power Limits of Single-Mode Optical Fibers due to Stimulated Brillouin Scattering in Optical Communication Systems, Journal of Lightwave Technology, vol. 6, No. 5, May 1988, pp. 710-719.
Ole Lumholt et al, "Optimum Position of Isolators within Erbium-Doped Fibers", IEEE Photonics Technology Letters, vol. 4, No. 6 Jun. 1992, pp. 568-570.

* cited by examiner

*Primary Examiner*—Jack Keith
*Assistant Examiner*—Ari M. Diacou
(74) *Attorney, Agent, or Firm*—Sughrue Mion, PLLC

(57) ABSTRACT

The invention is related to an optical amplifier connected to a pump laser with lengths of fibers and isolators between the lengths of fibers. The invention is also related to a transmission system using this amplifier and in addition the invention gives also a rule to optimize the position of isolators in a amplifier.

11 Claims, 2 Drawing Sheets

OPTICAL AMPLIFIER, TRANSMISSION SYSTEM AND METHOD FOR OPTIMIZATION

BACKGROUND OF THE INVENTION

The invention is based on a priority application EP 03 291 500.1 which is hereby incorporated by reference.

The invention is related to an optical amplifier connected to a pump laser with lengths of fibers and isolators between the lengths of fibers to suppress stimulated Brillouin scattering.

The invention is also related to a transmission system using this optical suppression mean.

In addition the invention gives also a rule to optimize the position of isolators in an optical amplifier.

Optical amplifiers of the type in which the amplitude of electric field of light is directly amplified are applicable to the following uses in the optical fiber transmission system and on the optical amplifiers of this type is being made in various areas:

By increasing the output of a light source of the signal light in an optical transmitter, the transmission distance can be increased. When the optical amplifier is used for the light source of local light in an optical receiver on a coherent optical wave communication system, the reception sensitivity can be improved.

By performing optical amplification in the stage immediately before the photoelectric conversion stage, the reception sensitivity can be improved.

By the direct amplification of light, as compared with the method in a conventional optical repeater in which a light signal is once photo-electrically converted into an electric signal and then the electric signal is amplified, it becomes possible to make the repeater itself smaller in size and also to increase the repeater-to-repeater distance.

Optical parametric amplification is carried out by a power transfer from a pump wavelength towards a signal wavelength. This energy exchange depends on phase matching between the waves of the two wavelengths, on their power and on fiber nonlinear coefficient. For 'small-signal' e.g. signal with a small power, signal power increases linearly with fiber length. To be efficient the signal power must increase up to the level of the pump power, and than the energy exchange between the wave is reversed. In result the signal wave recharges power back to the pump wave. Then the signal power decreases with length, which makes amplification inefficient.

In order to avoid signal power traveling back to the pump, fibers length in known optical parametric amplifiers is shorter than the length from which signal power decreases. Pump power remains non-depleted during amplification. The efficiency of parametric amplification strongly depends on the frequency shift between signal and pump (through phase matching) wave.

Another problem arise during pumping the parametric amplifier. Parametric amplification requires a high pump power and with the high pump powers nonlinear effects as stimulated Raman and Brillouin scattering occur.

Raman and Brillouin scattering are inelastic processes in which part of the power is lost from an optical wave and absorbed by the transmission medium while the remaining energy is re-emitted as a wave of lower (or higher) frequency. The processes can be thought of as the conversion of an incident photon into a lower energy scattered photon plus a phonon of vibrational energy. Total energy and momentum before and after scattering must be equal, i.e. the incident photon energy is shared between the phonon and the scattered photon. Since the frequency of an optical wave is proportional to its energy, the photon produced by the scattering event has a lower frequency than the incident photon. This frequency downshifted wave is commonly referred to as the Stokes wave. Spontaneous Raman and Brillouin scattering have been observed and measured in bulk samples of material. The growth of the Stokes wave is proportional to the product of the scattering gain coefficient, the intensity of the pump wave and the intensity of any Stokes wave present. In bulk media the Stokes wave quickly disperses as it propagates away from the point of generation. However, single mode optical fibers will support low-loss propagation for waves traveling almost parallel to the fiber axis. Consequently, scattered radiation in either the forward or backward directions relative to the incident wave will be guided within the fiber and will co-propagate with the pump wave over long distances. Under these circumstances, it is possible for the Stokes wave to continue to interact efficiently with the pump wave and exponential growth in the downshifted optical power occurs. For a given length of fiber, gradually increasing the pump power launched into one end will lead to a gradual increase in Stokes power through spontaneous scattering. If the pump power is then increased further, exponential growth in the Stoke power may occur. The input pump power at which the Stokes wave increases rapidly as a function of pump power is termed the stimulated scattering threshold. A major difference between Brillouin scattering and Raman scattering lies in the type of phonon generated—high-energy optical phonons in SRS and lower-energy acoustical phonons in SBS. The difference in frequency between the pump and Stokes waves is therefore much greater in SRS than in SBS. Typical values of the pump-Stokes frequency difference are 10-GHz (~0.1-nm at 1550-nm) for SBS and 13-THz (~110-nm at 1550-nm) for SRS. Another key distinction between the two effects is that the scattered wave due to SBS travels predominantly backwards. The SBS Stokes wave emerges from the input end of the fiber whereas the Stokes wave due to SRS travels forwards with the pump wave. Both SBS and SRS have threshold pump powers above which power transfer to the Stokes wave increases rapidly. In SBS this means that the amount of optical power leaving the far end of the fiber no longer increases linearly with the input power. The maximum launch power becomes clamped and excess power is simply reflected back out of the fiber. For long distance and highly branched fiber links, it is important that as much power as possible can be launched into the fiber to compensate for attenuation and power splitting. Limits on the maximum launch power due to SBS must therefore be avoided. The same problems arise when a parametric amplification scheme is used.

One way to avoid pumping above the SBS threshold is to broaden the pump spectrum. This is normally done by a phase modulation of the pumping signal. This need some additional effort to apply the special modulation formats on the pump and this only to broaden the spectrum, as explained in Y. Aoki, K. Tajima, I. Mito, "Input Power Limits of Single-Mode Optical, Fibers due to Stimulated Brillouin Scattering in optical communication, systems", J. Lightwave technology, vol.6 no.5, p710. It is the objective of the invention to overcome the problems with high pump signals arising SBS in an optical amplifier.

SUMMARY OF THE INVENTION

The invention solves the problem in an optical amplifier who comprises isolators to suppress the Brillouin wave propagating in opposite direction to the signal and pump waves.

In simple words: the use of an isolator in the fiber length of the parametric amplifier allows to split the fiber length for the Brillouin wave and therefore to increase the threshold of the SBS because this threshold depends reciprocal on the fiber length.

Especially the fiber of the parametric amplifier is disrupted by isolators in well defined positions for an optimal suppression of SBS. The number of isolators should be as small as possible to avoid losses for the whole amplifier and additional costs for the optical component.

The invention related also to a rule to define the position of the isolators by taking into account the attenuation of the fiber , the insertion loss at the isolators and the isolation factor.

This rule gives a method to optimize the positioning of isolators in a fiber used for parametric amplification .

The invention is applied to amplifiers solving specially problems arising in parametric amplifiers and Roman amplifiers. The invention is alos applied to transmission system where at a regenerator or in the line the Brillouin scattering will be a problem.

Figure 1:
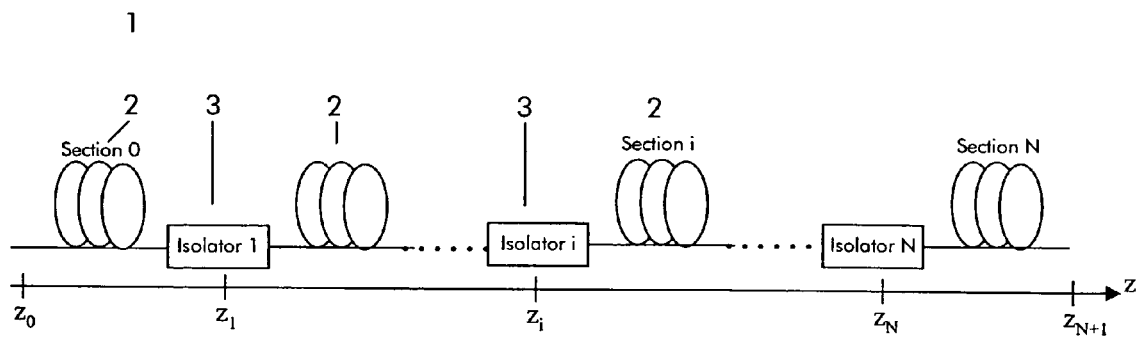
FIG. 1 shows the scheme of an parametric amplifier.

A parametric amplifier 1 is essentially constituted by a fiber pumped by a laser of high power. The pump light is coupled through a common coupler which not shown in the figure.

The fiber used to amplify the light is a high nonlinear fiber with a small effective area and a particular index profile. The fiber does not comprise any dopants for amplification.

The fiber 2 (length=L) is divided in N+1 sections and an isolator 3 is placed between each section. The insertion loss of the isolator 3 with number is $IL_i$.

The isolation parameter is $I_i$ (linear units) and the isolator I is located at $z_i$ meters from the input of the parametric fiber amplifier fiber. The type of isolator used is transparent for either signal and pump light wavelengths and in opposite direction blocking at least pump light wavelength with the Brillouin backscattered wavelength. The parametric amplifier can have all isolator types a person skilled in the art will use to realize the invention .

The length of the fiber section i is $z_{i+1}-z_i$, its attenuation is $\alpha_i$ in $m^{-1}$, its effective area $A_{eff}$ and its coefficient of Brillouin gain is $g_{Bi}$.

The use of isolators in an amplification system is well known. U.S. Pat. No. 5,375,010 disclosed an optical amplifier with doped fibers comprising an isolator to suppress the backwards traveling amplified spontaneous emission (ASE) of the signal. The position of this isolator between the pieces of doped fibers is not defined; nearly any position helps to suppress the ASE light.

A first estimation of the positions of the isolators could determine without taking into account isolation and insertion losses of the isolators. The isolator i must be placed at the abscissa $z_i$ chosen such as the effective length from $z_o$ to $z_i$ is equal to i.Leff/(N+1). (Leff is the effective length of the fiber).

This first estimation gives the optimized position of the isolators only in the case of isolators with a high isolation (I>78 dB). For the others cases, the positions are not optimized, isolation and insertion losses must be added in the calculations.

Improved Evaluation of the Positions

The Brillouin gain $G_i$ produced by the section i can be calculated as follows:

$$\ln[G_i \text{ linear}] = \frac{g_{Bi} K}{A_{effi}} P_p \frac{e^{\sum_{k=0}^{i-1} -\alpha_k(z_{k+1}-z_k)}}{\prod_{k=0}^{i} IL_k} \frac{1-e^{-\alpha_i(z_{i+1}-z_i)}}{\alpha_i} - \alpha_i(z_{i+1}-z_i)$$

In the equitation the assumption was made that $IL_0$ and $I_0$ equal to 1 since there is no isolator at $z_o$, that $z_{N+1}=L$ and $P_p$ is the pump power.

The Brillouin threshold is defined by the pump power which produces a linear Brillouin gain of exp[18], i.e. ln [G lin]=18. The value of 18 is derived from the photo-elastic characteristics of the silica fiber (complex formula) while the Brillouin threshold correspond the maximum power density you can launch into the fiber without having power reflected by the Brillouin effect (all additional power above this power will be reflected making the transmitted power constant as function of the input power when this input power is higher than the threshold).

Consequently with several different isolators (some with an isolation I such as ln[I]<18, i.e. I<78 dB, and others with ln[I]>18), it is preferable to alternate isolators with isolation I>78 dB and isolators with isolation I<78 dB. Thus the global gain produced on several consecutive sections is smaller.

To evaluate the maximum Brillouin threshold (that can be obtained with N given isolators) and the optimized positions of these isolators, a set of N+1 equations must be solved. We suppose that the order of the isolators is chosen.

Eq.N+1 is always: ln $[G_N]$=18.

The equation k is determined by this procedure: if ln $[I_k]$>18, Eq.k is ln $[G_{k-1}]$=18, $$\text{else } Eq.k \text{ is } \sum_{i=k-1}^{Imax} \ln[G_i] - \sum_{i=k}^{Imax} \ln[I_i] = 18,$$

where Imax is the number of the last of the following isolators such as ln[I]<18.

Some explanations for the choice of the equations: to choose the equation i, we consider the part of fiber from $z_{i-1}$ to $Z_{N+1}$. At $z_{i-1}$, the Brillouin gain must be equal to exp[18].

If isolation $I_i$ is large enough (ln[$I_i$]>18), the Brillouin gain from $z_i$ to $Z_{N+1}$ can reached exp[18] and is completely compensated by $I_i$ so that only the gain between $z_{i-1}$ and $z_i$ must be equal to exp[18]. But for smaller isolation, the part of fiber between $z_i$ and $Z_{N+1}$ must produce less Brillouin gain, so we take into account more sections in the calculation of the Brillouin gain to locate zi.

Figure 2:
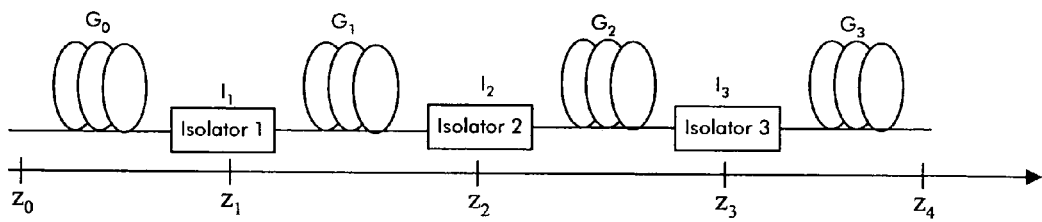
FIG. 2 is a scheme for a special calculation

The invention can be explained in more detail in an example. The amplifier comprises 3 isolators with the same insertion loss 0.5 dB and with 3 different isolations 40, 60 and 90 dB. We order the isolators: $I_1$=60 dB, $I_2$=90 dB and $I_3$=40 dB, see FIG. 2.

According to the above procedure, the set of equations to solve is:

$$\begin{cases} \ln[G_0] + \ln[G_1] - \ln[I_1] = 18 \\ \ln[G_1] = 18 \\ \ln[G_2] + \ln[G_3] - \ln[I_3] = 18 \\ \ln[G_4] = 18 \end{cases}$$

In the case of a fiber with length=800 m, isolators are placed at the abscissa 150 m, 380 m and 560 m (solutions of the equations), which enables to increase the Brillouin threshold of 5.9 dB.

Experiments are done with an isolator (isolation=60 dB, insertion loss=0.7 dB), where the Brillouin threshold of a fiber (L=3 km, Aeff=20 µm2) has been increased by 2.1 dB.

For the method to position optical isolators at defined positions of the parametric amplifier is a simple way to avoid problems with SBS this method can easy combined with the method of broadening the spectrum of the pump light. This solution according the invention does not increase the Brillouin threshold as much as the broadening of the spectrum of pump light. But the association of the 2 solutions enables to reduce the constraint on the spectral line width of the pump and then make the modulation format simpler. For instance, a pump spectral line width of 6 GHz is required to reach a Brillouin threshold of 25 dBm. One isolator could increase the Brillouin threshold by 2 dB so that the 25 dBm threshold is reached with a pump of 3.8 GHz spectral line width. Because of the insertion loss of the isolator, the pump is more attenuated and provides less gain. To compensate this reduction, more pump power must be injected in the fiber. For one isolator with 0.6 dB of insertion loss, the pump power must be increase by 0.4 dB for a case where the fiber is a highly nonlinear fiber ($\gamma=10$ W$^{-1}$.km$^{-1}$) and the initial pump power is 27 dBm.

A preferred embodiment of the invention uses length of fibers with adapted zero dispersion wavelengths. The zero dispersion wavelengths of a first length of fiber before an isolator I is the same as for the length following after this isolator i. The adaptation of the zero-dispersion wavelengths is to keep the same phase matching conditions between both sections of fiber and then to keep the some efficiency for the amplification (otherwise it is possible to have no amplification in the second fiber).

Figure 3:
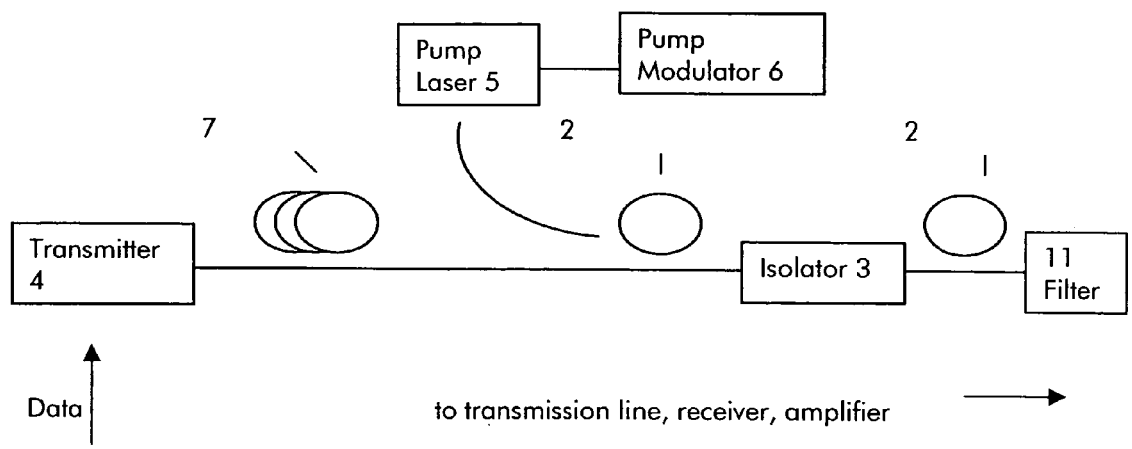
FIG. 3 shows a system using the parametric amplifier
Further details of the invention are described in the following description.

A system using the invention can be seen from FIG. 3. A transmitter is connected to a transmission line 7. The transmission line is connected to a parametric amplifier via a coupler. The second in port of the coupler is linked to a pump laser 5 who has a connection to a pump modulator 6. The parametric amplifier comprises piece of amplifying fibers 2 and at least one isolator 3. The amplified signal is again connected to the transmission line or alternatively to another amplifier or a receiver. The amplified signal is in this embodiment connected via an optical filter 11, which is able to filter out idler waves traveling along the amplifying fibers. The position of the filter 11 is variable and can be before or after the isolator. It is also possible to integrate the filter function for the idler in the isolation function.

The invention of positioning isolators at special fiber lengths for suppressing Brillouin scattering is adapted to be used in parametric amplification system but also for a Raman amplifier where the problem of a high pump power also limits the amplification. The invention can be also applied to a transmission system where in a regenerator the power of light increase over a level where SBS will become a problem. The invention gives a common rule for a system to overcome SBS related signal deprivation.

What is claimed is:

1. An optical parametric amplifier connected to a pump laser with lengths of fibers and isolators between the lengths of fibers where the positions of the at least two isolators are defined in a way that the sum of the stimulated Brillouin gain of the pump light in the fiber lengths is reduced and the Brillouin threshold is increased.

2. The parametric amplifier according claim 1 wherein the positions of the isolators are given by solving the equation $$\ln[G_i \text{linear}] = \frac{g_{Bi} K}{A_{effi}} P_p \frac{e^{\sum_{k=0}^{i-1} -\alpha_k(z_{k+1}-z_k)}}{\prod_{k=0}^{i} IL_k} \frac{1 - e^{-\alpha_i(z_{i+1}-z_i)}}{\alpha_i} - \alpha_i(z_{i+1} - z_i)$$

3. The parametric amplifier according claim 1 wherein the position of the isolators is substantially defined by the effective length of the fiber divided by the number of sections for isolators with a high attenuation rate.

4. The parametric amplifier according claim 1 wherein the isolation factor of the isolators differs between them.

5. The parametric amplifier according claim 1 wherein the lengths of fiber are not equal.

6. The parametric amplifier according claim 1 wherein the zero dispersion wavelength at the end of a length of the fiber before the isolator is the same as the zero dispersion wavelength at the beginning of the next length of fiber after the isolator.

7. The parametric amplifier according claim 1 comprising at least one filter for suppressing the idler wave.

8. A transmission system with transmitters, transmission lines and receivers also comprising means, wherein at least one mean is suppressing the stimulated Brillouin scattering by isolators wherein the positions of the isolators are given by solving the equation $$\ln[G_i \text{linear}] = \frac{g_{Bi} K}{A_{effi}} P_p \frac{e^{\sum_{k=0}^{i-1} -\alpha_k(z_{k+1}-z_k)}}{\prod_{k=0}^{i} IL_k} \frac{1 - e^{-\alpha_i(z_{i+1}-z_i)}}{\alpha_i} - \alpha_i(z_{i+1} - z_i)$$

9. The transmission system according claim 8, wherein the pump laser of the amplifier 1 is modulated by an modulator.

10. A method for optimization of position of isolators in a parametric amplifier connected to a pump laser with lengths of fibers and isolators between the lengths of fibers by Calculating the positions according to the effective lengths between the isolators and the number of sections between the isolators.

11. A method for optimization of position of isolators in a parametric amplifier connected to a pump laser with lengths of fibers and isolators between the lengths of fibers by solving the equation:

$$\ln[G_i \text{linear}] = \frac{g_{Bi} K}{A_{effi}} P_p \frac{e^{\sum_{k=0}^{i-1} -\alpha_k(z_{k+1}-z_k)}}{\prod_{k=0}^{i} IL_k} \frac{1 - e^{-\alpha_i(z_{i+1}-z_i)}}{\alpha_i} - \alpha_i(z_{i+1} - z_i)$$

* * * * *